United States Patent [19]
Riley et al.

[11] Patent Number: 5,667,230
[45] Date of Patent: Sep. 16, 1997

[54] RACK LIFT ASSEMBLY

[75] Inventors: David M. Riley, Garland; Curtis W. Olson, Plano; Jeffrey S. Williamson, Carrollton; Brian M. Attard, Allen; Michael K. Pratt, Plano, all of Tex.

[73] Assignee: DSC Communications Corporation, Plano, Tex.

[21] Appl. No.: 459,659

[22] Filed: Jun. 2, 1995

[51] Int. Cl.$^6$ ...................................................... B62B 3/10
[52] U.S. Cl. ...................... 280/79.11; 280/35; 280/79.7; 280/639
[58] Field of Search ...................... 280/35, 38, 638, 280/639, 641, 656, 43, 43.11, 43.12, 43.14, 43.17, 43.24, 47.131, 47.35, 79.11, 79.7

[56] References Cited

U.S. PATENT DOCUMENTS

| | | | |
|---|---|---|---|
| 243,566 | 5/1881 | Ireland | 280/641 |
| 431,953 | 7/1890 | Pinckney | 280/641 |
| 452,714 | 5/1891 | Martin | 280/43 |
| 1,100,702 | 6/1914 | Holmes | 280/43.24 |
| 2,008,887 | 7/1935 | Venables | 280/35 |
| 2,233,262 | 2/1941 | Jacobson | 155/30 |
| 2,375,720 | 5/1945 | Wood | 280/35 |
| 2,446,518 | 8/1948 | Arnold et al. | 280/43 |
| 2,933,322 | 4/1960 | Derse, Sr. | 280/43 |
| 2,968,490 | 1/1961 | Baus | 280/35 |
| 3,169,780 | 2/1965 | Runyan | 280/79.11 |
| 3,488,062 | 1/1970 | Walda | 280/43 |
| 3,904,216 | 9/1975 | Metrailer | 280/43 |
| 4,109,926 | 8/1978 | Lane | 280/39 |
| 4,417,738 | 11/1983 | Kendall | 280/43.17 |
| 5,037,117 | 8/1991 | Hershberger | 280/35 |
| 5,433,460 | 7/1995 | Young | 280/79.7 |

Primary Examiner—Brian L. Johnson
Assistant Examiner—Min S. Yu
Attorney, Agent, or Firm—Baker & Botts, L.L.P.

[57] ABSTRACT

A rack lift assembly (10) includes a side mount plate (12) that can be connected to an equipment rack holding telecommunication equipment. A caster plate (14) connects to the side mount plate (12) by a loose pin hinge (26) and by a latch pin (18). The latch pin (18) has two apertures (22 and 24) that can receive a deadbolt (20) from caster plate (14). Caster plate (14) includes a wheel (34) that is placed in contact with the floor or ground when the deadbolt (20) is secured within the first aperture (22) of the latch pin (18), placing the caster plate (14) in its operating position. The caster plate (14) is placed in an inoperational position by securing the deadbolt (20) into the second aperture (24) of the latch pin (18). The side mount plate (12) includes rollers (16) that allow for transportation of telecommunication equipment during low clearance situations while the caster plate (14) is placed in its inoperational position.

10 Claims, 1 Drawing Sheet

RACK LIFT ASSEMBLY

TECHNICAL FIELD OF THE INVENTION

The present invention relates in general to transportation of telecommunication systems and more particularly to a rack lift assembly.

BACKGROUND OF THE INVENTION

During normal testing of telecommunications equipment, the telecommunications equipment are placed in racks and connected by cabling as if set up in its intended operating environment. After testing is complete, the cables connecting the telecommunications equipment within the equipment racks are removed in order to allow for transportation of the equipment racks containing the telecommunications equipment to their intended site. The process of removing, and subsequently installing at the operating site, cables from the telecommunications equipment may cause subsequent operational problems despite the fact that the telecommunications equipment have been fully tested. Therefore, it is desirable to transport the telecommunications equipment without having to remove the cable connections between the telecommunications equipment.

From the foregoing, it may be appreciated that a need has arisen for an apparatus that can be used in transporting equipment racks containing telecommunications equipment without disconnecting cabling between the telecommunications equipment. A need has also arisen for a transport apparatus that can be easily installed while the telecommunications equipment are cabled together.

SUMMARY OF THE INVENTION

In accordance with the present invention, a rack lift assembly for transporting telecommunication equipment is provided that substantially eliminates or reduces disadvantages and problems associated with conventional transportation techniques.

According to an embodiment of the present invention, there is provided a rack lift assembly for transporting telecommunication equipment that includes a side mount plate connected to an equipment rack holding the telecommunication equipment. A caster plate is removably and rotatably connected to the side mount plate. The side mount plate has a latch bar to secure the caster plate in an operating position. The caster plate has a wheel to provide movement of the equipment rack that holds the telecommunication equipment.

The present invention provides various technical advantages over conventional transport techniques. For example, one technical advantage is in transporting telecommunication equipment without disconnecting the telecommunication equipment for movement. Another technical advantage is in providing a rack lift assembly that can be installed while telecommunications equipment is connected. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
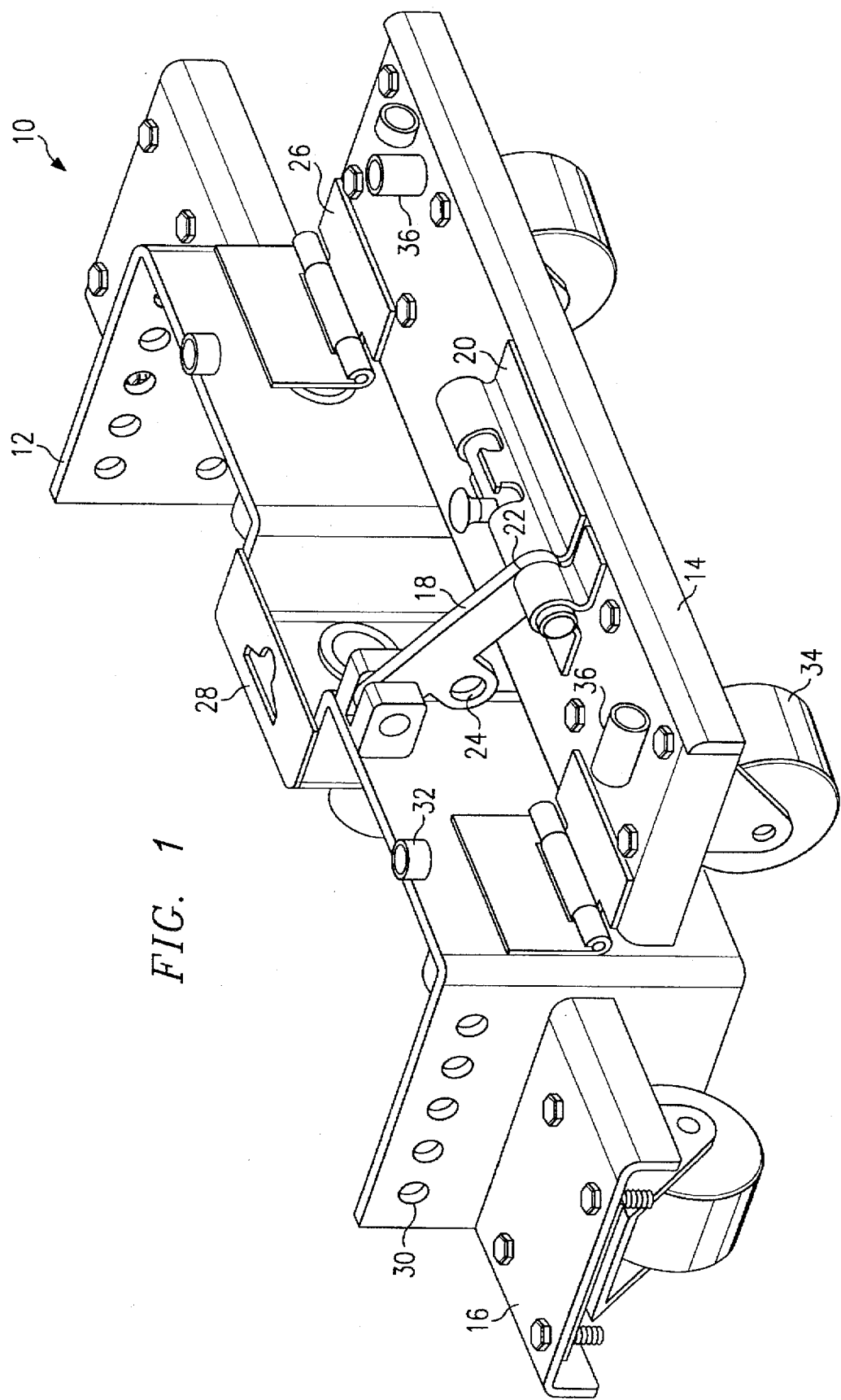
FIG. 1 illustrates a schematic diagram of a rack lift assembly.

FIG. 1 is a simplified schematic diagram of a rack lift assembly 10. Rack lift assembly 10 includes a side mount plate 12 and a caster plate 14 connected to side mount plate 12. Rack lift assembly 10 also includes a pair of optional rollers 16 connected to side mount plate 12.

Side mount plate 12 is designed to connect to a lower side portion of an equipment rack that holds telecommunication equipment. Side mount plate 12 includes a latch pin 18 that places caster plate 14 into its operating position through connection of a deadbolt 20. Latch pin 18 has a first aperture 22 for receiving deadbolt 20 in order to place caster plate 14 into an operating position. Latch pin 18 also has a second aperture 24 for receiving deadbolt 20 in order to place caster plate 14 into an inoperational position. Side mount plate 12 also includes a loose pin hinge 26 that rotatably connects caster plate 14 to side mount plate 12.

Side mount plate 12 includes an aperture 28 capable of receiving a pull bar. The pull bar can be used within aperture 28 for moving the equipment rack containing the telecommunication equipment. Side mount plate 12 also includes apertures 30 used to connect support bars in order to provide the ability to lift the equipment rack holding the telecommunication equipment. Side mount plate 12 also includes coupling tubes 32 used to connect two equipment racks together through separate rack lift assemblies. Coupling tubes 32 receive the coupling rod in order to place rack lift assemblies and equipment racks in a train-like coupling.

Caster plate 14 includes a wheel 34 that provides transportation capability for the equipment rack holding the telecommunication equipment. Wheel 34 comes in contact with the ground when deadbolt 20 is fed through aperture 22 of latch pin 18. Caster plate 14 can be placed in an inoperational position when deadbolt 20 is fed through aperture 24 of latch pin 18. In the inoperational position, caster plate 14 is raised away from the ground and the equipment rack holding the telecommunication equipment can be lowered onto optional rollers 16. Optional rollers 16 can be used to transport the equipment rack in low clearance situations such as through doorways.

Caster plate 14 also includes leverage tubes 36 that can be used in placing caster plate 14 into either its operating or inoperational position. A leverage rod is placed within leverage tube 36 in order to position caster plate 14 while side mount plate 12 is bearing the weight of the equipment rack holding the telecommunication equipment. When placing the equipment rack holding the telecommunication equipment into its intended site, caster plate 14 can be placed in its inoperational position and rollers 16 can be removed to allow side mount plate 12 to rest on the ground.

An equipment rack preferably has two rack lift assemblies 10 attached to opposite lower sides in order to facilitate transportation. Multiple equipment racks may be connected into a train configuration as previously described. Support bars may be connected between two rack lift assemblies 10 of a single equipment rack to provide the support capability for lifting the equipment rack at the support bars of the rack lift assembly. Rack lift assembly 10 can be mounted onto the lower side of the equipment rack without removing any cables connecting the telecommunication equipment or lifting the equipment rack. Once mounted, the leverage bar may be used to place rack lift assembly 10 into position for transportation.

In summary, a rack lift assembly provides the capability to transport telecommunication equipment without disconnecting the telecommunication equipment for movement. The rack lift assembly includes a side mount plate connected to an equipment rack holding the telecommunication equipment. A caster plate connects to the side mount plate through use of a latch pin. The latch pin places the caster plate into either an operating or inoperational position. In the operating position, the caster plate includes a wheel such that telecommunication equipment can be rolled across the floor. The side mount plate includes rollers that can transport the telecommunications equipment for lower height clearances while the caster plate is placed in its inoperational position.

Thus, it is apparent that there has been provided, in accordance with the present invention, a rack lift assembly for transporting telecommunication equipment that satisfies the advantages set forth above. Although the preferred embodiment has been described in detail, it should be understood that various changes, substitutions, and alterations can be made herein. For example, though the caster plate is shown connected to the side mount plate by a loose pin hinge, any other type of rotatable connection may be used. Other examples are readily ascertainable by one skilled in the art and can be made without departing from the spirit and scope of the present invention as defined by the following claims.

What is claimed is:

1. A rack lift assembly for transporting telecommunication equipment, comprising:
   a side mount plate operable to connect to an equipment rack holding the telecommunication equipment;
   a caster plate removably and rotatably connected to said side mount plate, said side mount plate having a latch pin to secure said caster plate in an operating position, said caster plate having a deadbolt to secure said latch pin to said caster plate, said caster plate having a first wheel and a second wheel to provide movement of the telecommunication equipment.

2. The rack lift assembly of claim 1, further comprising:
   a pair of rollers connected on opposite sides to said side mount plate, said pair of rollers being at a higher level than said first and second wheels such that the equipment rack holding the telecommunication equipment is lowered onto said pair of rollers upon removal of said caster plate, said pair of rollers providing for transport of the telecommunication equipment in low height clearance situations.

3. The rack lift assembly of claim 1, wherein said side mount plate has an aperture for a pull bar to assist in moving the telecommunication equipment.

4. The rack lift assembly of claim 1, wherein said latch pin is operable to hold said caster plate in an inoperational position.

5. The rack lift assembly of claim 1, wherein said caster plate is rotatably connected to said side mount plate by a loose pin binge.

6. The rack lift assembly of claim 1, wherein said caster plate includes a leverage tube operable to receive a leverage bar in order to place said caster plate into and remove said caster plate from said operating position.

7. The rack lift assembly of claim 6, wherein said caster plate has a receptacle for securing said leverage bar.

8. The rack lift assembly of claim 1, wherein said side mount plate has a coupling tube operable to receive a connecting rod in order to couple a plurality of rack lift assemblies together.

9. The rack lift assembly of claim 1, wherein said caster plate has a same length as said side mount plate.

10. The rack lift assembly of claim 1, wherein said latch pin has a first and second aperture, said first aperture operable to receive said deadbolt to hold said caster plate in its operational position, said second aperture operable to hold said caster plate in a non-operational position.

* * * * *